United States Patent [19]
Okada et al.

[11] Patent Number: 5,414,711
[45] Date of Patent: May 9, 1995

[54] ERROR DETECTOR CIRCUIT AND METHOD THEREFOR

[75] Inventors: Tomoyuki Okada, Palatine; Dale F. Medendorp, Crystal Lake; Terrie L. Frane, Bloomingdale, all of Ill.

[73] Assignee: Motorola Inc., Schaumburg, Ill.

[21] Appl. No.: 64,266

[22] Filed: May 20, 1993

[51] Int. Cl.$^6$ .......................................... H04L 27/22
[52] U.S. Cl. .................... 371/5.1; 371/38.1; 375/324
[58] Field of Search .............. 371/5.1, 37.2, 37.7, 371/38.1, 42; 375/82, 83, 80, 94, 95, 102

[56] References Cited
U.S. PATENT DOCUMENTS 5,272,446 12/1993 Chalmers et al. .................. 375/80

*Primary Examiner*—Vincent P. Canney
*Attorney, Agent, or Firm*—Dale B. Halling

[57] ABSTRACT

An error detector circuit and associated method for a digital receiver. The digital receiver is operative in a TDMA communication scheme in which DQPSK-modulated signals are generated, such as the Japanese Digital Cordless Telephone System. The error detector circuit detects times in which an excessive amount of noise or other distortion is introduced upon one or more sequences of a signal transmitted during one or more time slots in the TDMA communications scheme. A receiver incorporating the error detector circuit is operative not to decode portions of a received signal when excessive numbers of sequences include excessive amounts of noise or other distortion introduced thereupon. Thereby, degradation of the audio quality of a signal actually recreated by the receiver incorporating the error detector.

23 Claims, 4 Drawing Sheets

ERROR DETECTOR CIRCUIT AND METHOD THEREFOR

BACKGROUND OF THE INVENTION

The present invention relates generally to error detector circuits and, more particularly, to an error detector circuit, and associated method, for a receiver operative to receive a discretely-encoded signal.

A communication system is comprised, at a minimum, of a transmitter and a receiver interconnected by a transmission channel. A communication signal generated by the transmitter is transmitted upon the transmission channel, thereafter to be received by the receiver.

A two-way communication system is a communication system which permits both transmission and reception of communication signals between at least two locations. Two-way communication between the at least two locations is thereby permitted.

A radio communication system is a communication system wherein the transmission channel comprises a radio frequency channel. The radio frequency channel is defined by a range of frequencies of the electromagnetic frequency spectrum. A transmitter operative in a radio communication system converts a communication signal which is to be transmitted into a form suitable for transmission thereof upon the radio frequency channel.

Conversion of the communication signal into the form suitable for the transmission thereof upon the radio frequency channel is effectuated by a process referred to as modulation. In such a process, the communication signal is impressed upon an electromagnetic wave. The electromagnetic wave is commonly referred to as a "carrier signal." The resultant signal, once modulated by the communication signal, is referred to as a modulated carrier signal or, more simply, a modulated signal. The transmitter includes circuitry to perform such a modulation process.

Because the modulated signal may be transmitted through free space over large distances without the requirement of a fixed connection between the transmitter and the receiver operative in such a radio communication system, radio communication systems are oftentimes utilized to effectuate communication between a transmitter and a remotely-positioned receiver.

The receiver of a radio communication system which receives the modulated signal contains circuitry analogous to, but operative in a manner reverse with that of, the circuitry of the transmitter and is operative to perform a process referred to as demodulation.

A radio transceiver is a device which includes both a radio transmitter and a radio receiver to permit thereby two-way communication therethrough.

Improvements in radio telephony techniques and apparatus have permitted a significant increase in the utilization of radio communication systems. However, because the transmission channels upon which the modulated signals of the radio communication systems are transmitted are formed of radio frequency channels, and because radio frequency channels are limited in number by the amount of the electromagnetic frequency spectrum allocated for use by various radio communication systems, further increased utilization of various radio communication systems is limited by limitations in the number of the radio frequency channels upon which modulated signals may be transmitted.

Generally, only by increasing the number of frequency channels defined upon a frequency band or by more efficiently utilizing the frequency channels defined upon the frequency band may the communication capacity of a communication system operable upon a particular frequency band be increased.

By converting a communication signal into discrete form prior to transmission thereof, more efficient facilitation of a presently-defined frequency channel is possible as the resultant modulated signal is typically of a smaller modulation spectrum than a corresponding modulated signal comprised of a communication signal that has not been converted into discrete form. And, when the communication signal is converted into discrete form prior to modulation thereof, the resultant, modulated signal may be transmitted in short bursts, and more than one modulated signal may be transmitted sequentially upon a single frequency channel.

As a single frequency channel may be utilized to transmit two or more separate signals during nonoverlapping time periods, a method of signal transmission in which two or more separate signals are transmitted in such manner is oftentimes referred to as a time division method. A communication system incorporating such a time division method of signal transmission includes a Time Division Multiple Access communication system or, more simply, a TDMA communication system.

A TDMA communication system includes a transmitter operative to transmit signals to a receiver in bursts during intermittent time periods. Such signal shall, at times, hereinafter be referred to as a TDMA signal. A TDMA communication system further includes a receiver operative to receive a TDMA signal. The discretely-encoded communication signal transmitted in the intermittent bursts is transmitted during particular time slots defined by the TDMA communication scheme in which the TDMA communication system is operable. The signal transmitted by a transmitter during any particular time slot shall hereinafter be referred to as a sequence.

Other types of communication systems similarly convert a communication signal into discrete form prior to transmission thereof.

Whenever a signal is converted into discrete form and transmitted as sequences of discrete information bits, noise and other interference introduced upon the communication signal during transmission thereof upon the transmission channel results in distortion of the transmitted signal. When a receiver receives the transmitted signal including significant amounts of such distortion, the receiver is unable to decode accurately the received signal in order to recreate the signal actually transmitted by the transmitter. As a result, the audio quality of the received signal, once recreated by the receiver, is degraded.

The receiver oftentimes includes circuitry operative to determine the amount of distortion introduced upon the signal during transmission thereof to the receiver. When such circuitry determines that excessive amounts of distortion are introduced upon portions of the communication signal, the circuitry may be made further operative to cause the receiver not to decode the affected portions of the communication signal. Thereby, degradation of the audio quality of the signal actually recreated by the receiver may be minimized.

Various signalling protocols have been developed which are operative, in conjunction with the circuitry of the receiver, to permit a receiver to determine better whether a signal transmitted thereto includes excessive amounts of noise or other interference introduced thereupon. For instance, a TDMA communication system protocol scheme has been promulgated in Japan in a standard specification for cordless telephone-type apparatus. The protocol scheme includes requirements for formatting sequences of the signal transmitted during the intermittent time periods of a TDMA communication system and also the modulation method in which a modulated signal is formed. Namely, the modulation method is a Differential Quadrature Phase Shift Keying (DQPSK) method.

A portion of the sequence transmitted during the selected time slots includes not only portions of the information signal converted into discrete form, but also predetermined data transmitted for purposes of timing and signal protocol. Included amongst such predetermined data are sequences of selected codes. Corresponding codes are stored in the receiver, and, when the receiver receives a signal transmitted thereto, the receiver compares the received signal with the stored information.

In the above-mentioned Japanese standard specification, such codeword is referred to as a "unique word." When the receiver determines that the unique word received by the receiver differs with the unique word stored by the receiver, the receiver is able to make a determination that excessive amounts of noise or other distortion have been introduced upon a transmitted signal. Use of such a determination alone, however, permits a receiver, in some instances, to determine that a sequence of a received signal does not include excessive amounts of noise or other distortion introduced thereupon when, in fact, excessive amounts of noise or other distortion have been introduced thereupon.

The same above-mentioned, Japanese standard specification further sets forth a second code which forms a portion of the data transmitted by a transmitter with each sequence of information transmitted to the receiver. Such code, referred to as a Cyclic Redundancy Code (CRC), may also be utilized, once received by a receiver, to make a determination as to whether excessive amounts of noise or other distortion have been introduced upon the sequence of the signal during transmission thereof to the receiver. Determination of whether a sequence of a signal transmitted to a receiver includes excessive amounts of noise or other distortion introduced upon the sequence during transmission thereof to the receiver based solely upon analysis of the Cyclic Redundancy Code, however, results in the receiver determining that too many sequences of the transmitted signal include excessive amounts of noise or other distortion. Accordingly, determinations made by the receiver as to whether excessive amounts of noise or other distortion have been introduced upon the sequence of the signal transmitted to the receiver based solely upon analysis of the Cyclic Redundancy Code is also inadequate.

What is needed, therefore, is circuitry for a receiver which permits the receiver to make an accurate determination as to whether or not a portion of a discretely-encoded signal received thereat contains excessive amounts of noise or other distortion introduced thereupon. Such determination would permit degradation of the audio quality of the signal actually recreated by the receiver to be minimized, as the receiver may be caused not to decode portions of the discretely-encoded signal which contain excessive amounts of noise or other distortion.

SUMMARY OF THE INVENTION

The present invention, accordingly, advantageously provides circuitry for a receiver which permits the receiver to make an accurate determination as to whether a portion of a discretely-encoded signal received by the receiver contains excessive amounts of noise or other distortion introduced thereupon.

The present invention further advantageously provides a method for a receiver to permit the receiver to make such a determination.

The present invention yet further advantageously provides a radio receiver including circuitry for determining whether a portion of a discretely-encoded signal received thereat contains excessive amounts of noise or other distortion introduced thereupon. The receiver is further operative to prevent decoding of portions of the discretely-encoded signal which contain excessive amounts of noise or other distortion, thereby permitting degradation of the audio quality of the signal actually recreated by the receiver to be minimized.

The present invention includes further advantages and features, the details of which will become more readily apparent upon reading the detailed description of the preferred embodiments hereinbelow.

In accordance with the present invention, therefore, an error detector circuit, and associated method, for a receiver operative to receive a discretely-encoded signal comprised of at least one sequence of a plurality of signal portions having phase values associated therewith is disclosed. The at least one sequence includes a first sequence portion and a second sequence portion. The error detector circuit, and associated method, is operative to detect when a sequence of the at least one sequence comprising the discretely-encoded signal is comprised of excessive numbers of erroneous signal portions. A first sequence portion comparator determines when the first sequence portion of the at least one sequence comprising the discretely-encoded signal is received by the receiver with greater than a first threshold number of errors. A first comparison signal of a first signal level is generated responsive thereto. A second sequence portion comparator determines when the second sequence portion of the at least one sequence comprising the discretely-encoded signal is received by the receiver with greater than a second threshold number of errors. A second comparison signal of a first signal level is generated responsive thereto. A phase error detector determines when phase differences between adjacent symbols of the discretely-encoded signal are beyond allowable signal levels greater than a third threshold number of times. A phase error signal of a first signal level is generated responsive thereto. An error signal generator generates an error signal when either the first sequence portion comparator generates the first comparison signal of the first signal level or in which both the phase error detector generates the phase error signal of the first signal level and the second sequence portion comparator generates the second comparison signal of the first signal level, collectively in excess of a fourth threshold number of times.

BRIEF DESCRIPTION OF THE DRAWINGS

The present invention will be better understood when read in light of the accompanying drawings in which.

DESCRIPTION OF THE PREFERRED EMBODIMENT

In a conventional radio transmitter, a modulated signal is generated by a conventional, continuous-wave modulation technique, and the modulated signal is transmitted continuously to transmit the modulated signal upon a transmission channel comprised of a frequency channel defined upon a frequency band of the electromagnetic frequency spectrum. In a conventional radio transceiver, comprised of both a radio transmitter portion and a radio receiver portion, a modulated signal is similarly generated by a continuous-wave modulation technique and transmitted continuously. A modulated signal transmitted to the radio transceiver, and received by the radio receiver portion thereof, similarly is transmitted continuously upon a transmission channel. As both the modulated signal transmitted by, and received by, a conventional radio transceiver are continuously transmitted, two transmission channels must be allocated to permit two-way communication with a conventional radio transceiver.

As mentioned hereinabove, use of radio communication systems has increased significantly. Existing frequency bands allocated for various radio communication systems have, at times, been utilized at, or close to, full capacity. Accordingly, to permit further increase in usage of various of the radio communication systems, schemes have been developed to permit more efficient utilization of the existing frequency bands.

In particular, modulation schemes have been developed to encode and to modulate an information signal in manners which permit the modulated signal to be transmitted in bursts during intermittent time periods. Because a transmitter need not transmit the modulated signal continuously, but rather transmits the signal during discrete bursts, a single frequency channel may be utilized to transmit more than one modulated signal. That is to say, two or more radio transmitters constructed to transmit modulated signals in such discrete bursts may transmit modulated signals upon a single frequency channel as long as the modulated signals generated by respective ones of the radio transmitters do not overlap in time. In this manner, the transmission capacity of existing frequency bands may be increased significantly.

Figure 1:
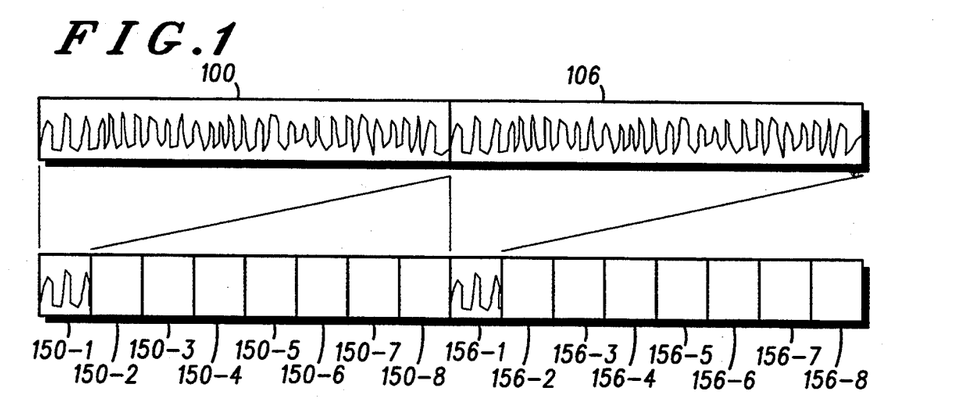
FIG. 1 is a schematic representation illustrating the relationship between a modulated signal generated by a conventional, continuous-wave modulation technique and a modulated signal generated by a modulation technique permitting transmission of the modulated signal in discrete bursts.

Referring first now to the schematic illustration of FIG. 1, the relationship between a modulated signal generated by a conventional, continuous-wave modulation technique (here, a frequency modulation technique), and a modulated signal formed in manner permitting transmission thereof in discrete bursts is shown. The top portion of FIG. 1 shows tandemly-positioned blocks 100 and 106. Pictured within blocks 100 and 106 is a wave form generated by a conventional, continuous-wave modulation technique. A conventional radio transmitter constructed to generate and to transmit such a modulated signal transmits the modulated signal continuously during transmission thereof. As the signal is transmitted continuously, a single transmission channel must be allocated to permit the continuous transmission of the modulated signal. A receiver operative to receive such a transmitted signal similarly must be continuously operable to receive the signal which is continuously transmitted thereto.

However, when the signal is converted into discrete form, the signal may be reconfigured into a more efficient form which permits the signal to be transmitted in discrete bursts during intermittent time periods. The bottom portion of FIG. 1 represents transmission of the same communication signal as that represented in the top portion of FIG. 1 but wherein the signal is converted into discrete form and transmitted according to a TDMA communication scheme. The information content of the waveforms pictured within blocks 100 and 106 are mapped into block portions 150-1 and 156-1, respectively. Such block portions are oftentimes referred to by the term "time slots." The scheme illustrated in FIG. 1 is that of an eight-to-one compaction ratio. In other schemes, other ratios are, of course, possible. The waveforms pictured within block portions 150-1 and 156-1 are representative of transmission of a modulated signal in discrete bursts as the information content of the waveforms pictured in blocks 100 and 106, once encoded, may be transmitted in the discrete bursts represented by the waveforms pictured within block portions 150-1 and 156-1.

While no waveforms are pictured within block portions 150-2 through 150-8 and 156-2 through 156-8, such block portions represent time periods in which other signals may be transmitted in discrete bursts.

Once a discretely-encoded signal is received by a receiver, the receiver demodulates and decodes the received signal. While demodulation and decoding circuitry is available to perform such a function, if significant amounts of noise or other distortion is introduced upon the signal during transmission thereof to the receiver, the demodulating and decoding circuitry of the receiver is unable to determine accurately the information content of the transmitted signal.

When the receiver is unable to determine accurately the information content of the signal actually transmitted, the resultant signal recreated by the receiver is erroneous, and, oftentimes, when the resultant signal is converted into audible form, the quality of such signal is degraded. The receiver includes circuitry to attempt to determine times in which excessive amounts of noise and other distortion are introduced upon the signal received by the receiver to prevent accurate recreation of the signal actually transmitted. Such determination permits degradation of the audio quality of the signal actually recreated by the receiver to be minimized as the receiver does not decode portions of the discretely-encoded signal which contain excessive amounts of noise or other distortion.

To assist in a determination of the times in which a signal received by a receiver includes excessive amounts of noise and other distortion, communication schemes which utilize discretely-encoded communication signals, including TDMA communication schemes, oftentimes introduce synchronization information, typically information in the form of preselected sequence portions of data, into the encoded signal. Each sequence of a modulated signal transmitted by a radio transmitter in discrete bursts typically includes one or more sequence portions of data. And, once a sequence including such one or more sequence portions is received by a receiver, the synchronization information comprised of such sequence portions is utilized by the receiver for synchronization and timing purposes.

Figure 2:
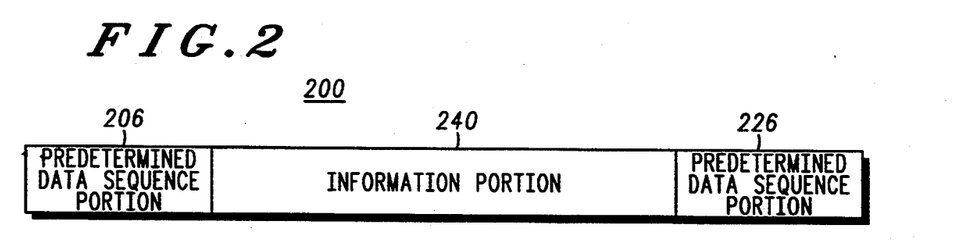
FIG. 2 is a representation of the format of a single sequence of the modulated signal shown in the bottom portion of FIG. 1 transmitted in the discrete bursts.

Turning now to the schematic representation of FIG. 2, the format of a discretely-encoded, modulated signal transmitted during a single time period, such as block portions 150-1 or 156-1 of FIG. 1 is shown. As noted previously, such block portions are oftentimes referred to as "time slots" and such terminology shall be utilized hereinbelow. Slot 200 is representative of a modulated signal transmitted during a time slot such as that represented by block portions 150-1 or 156-1 of FIG. 1. As illustrated, slot 200 is comprised of pre-determined data sequence portions 206 and 226 and information portion 240.

Pre-determined data sequence portion 206 is represented at a left-hand side of slot 200 to indicate typical positioning thereof at a "front end" of the slot, and data sequence portion 226 is positioned at a right-hand side portion of slot 200 to indicate typical positioning thereof at a "back end" of the slot. Data sequence portions 206 and 226 may be comprised of different types of data depending upon system standards of the particular communication scheme in which the signal is transmitted.

Figure 3:
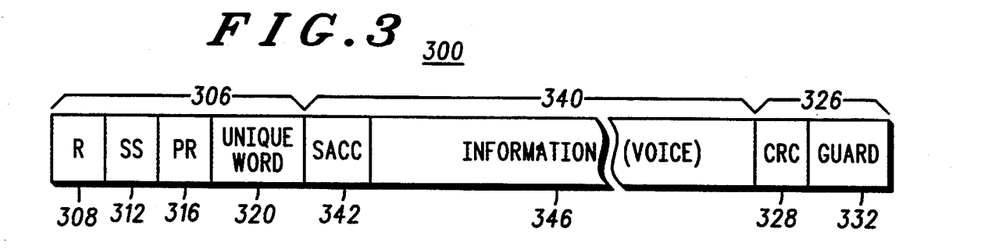
FIG. 3 is a representation, similar to that of FIG. 2, but of the format of a sequence of a modulated signal transmitted in the Japanese Digital Cordless Telephone System.

FIG. 3 is a schematic representation of a single time slot, referred to generally by reference numeral 300, defined by standards promulgated in the aforementioned Japanese cordless telephone system standard specification. Slot 300 is analogous in configuration to the more generalized slot structure of slot 200 of FIG. 2. Again, slot 300 is representative of a modulated signal generated during a time period represented by block portions 150-1 or 156-1 of FIG. 1. Slot 300 is comprised of a first pre-determined data sequence portion 306 represented at the "front end" of the slot. Pre-determined data sequence portion 306 is comprised of ramp bits (R) 308, start sequence (SS) bits 312, preamble bits (PR) 316, and unique word bits 320. Details relating to the data comprising portion 306 may be found in the aforementioned standard specification.

Data sequence portion 326 is represented at a "back end" side of slot 300 and is shown to be comprised of cyclic redundancy check bits (CRC) 328 and guard time period (GUARD) 332. Details relating to the data and time period comprising portion 326 may also be found in the aforementioned standard specification.

Information portion 340 contains the information content of the information signal which is encoded to form a portion of slot 300. Information portion 340 of slot 300 corresponds to information portion 240 of slot 200 of FIG. 2. Here, information portion 340 is comprised of slow associated control channel bits (SACC) 342 (which comprises data information) and voice information 346.

A transmitter operative to transmit modulated signals of a form specified by the Japanese digital cordless telephone standard specification is operable to transmit sequences in discrete bursts during intermittent time periods. A sequence, similar in format to that shown in FIG. 3, of the modulated signal is transmitted during intermittent time periods, similar in manner to that shown at the bottom portion of FIG. 1.

A receiver operable to receive such sequences transmitted thereto in the discrete bursts during the intermittent time periods demodulates and decodes the received signal, thereby to recreate the transmitted signal. Because, however, the transmission channel upon which such sequences are transmitted are not noise-free, noise and other distortion introduced upon the one or more sequences of the signal transmitted in the discrete bursts during the intermittent time periods may distort portions of such one or more sequences. When excessive amounts of noise and other distortion are introduced upon sequences transmitted to the receiver, the receiver is unable to demodulate and decode accurately the signal actually transmitted by a transmitter.

When a sequence, or an excessive number of sequences, of a signal received by a receiver includes excessive amounts of noise or other distortion, the receiver should not attempt to demodulate and decode the sequence. Receiver circuitry operative in the Japanese digital cordless system, as well as others, includes circuitry to assist in determinations of times in which excessive amounts of noise or other distortion are introduced upon sequences of signals received by the receiver.

For instance, utilization of unique word portion 320 of predetermined data sequence portion 306 of slot 300 of FIG. 3 may be utilized by the receiver to obtain an indication of times in which excessive amounts of noise and other distortion are introduced upon a signal transmitted to the receiver. Because the unique word portion 320 of sequence portion 306 is preselected, the receiver may include circuitry for storing data representative of the unique word portion 320 which is to be transmitted by a transmitter as well as comparator circuitry for comparing the stored data with the unique word portion of sequence portion 306 actually received by the receiver.

If the received unique word portion 320 does not correspond with the data stored by the receiver, the receiver may make a determination not to decode the sequence received by the receiver of which the particular unique word portion 320 forms a portion. As also noted previously, use of such a sole determination as to whether or not to demodulate and decode a particular sequence of a signal received by a receiver is inadequate as the receiver does not make a determination not to decode a sequence of a signal transmitted thereto every time in which excessive amounts of noise and other distortion is introduced upon a sequence during transmission to the receiver. As a result, degradation of the audio quality of the signal actually recreated by the receiver may occur.

The receiver may also include circuitry for calculating or determining the expected values of the cyclic redundancy code 328 of sequence portion 326 of sequence 300 responsive to reception of information bit 340 and for thereafter comparing the calculated, expected values of the cyclic redundancy code with the cyclic redundancy code 328 actually received by the receiver. Responsive to such comparison, a determination may be made of times in which excessive amounts of noise and other distortion are introduced upon the sequence of the signal during transmission thereof to the receiver. However, as also noted previously, such a determination results in excessive numbers of sequences not to be decoded by a receiver. Hence, such a sole method of determining whether or not to decode a sequence of a signal transmitted to a receiver is also inadequate to permit efficient communication between a transmitter and a receiver.

Because the modulation scheme utilized by the Japanese digital cordless telephone system set forth in the above-mentioned promulgation is a Differential Quadrature Phase Shift Keying (DQPSK) modulation scheme, the sequences of the signal transmitted by the transmitter are comprised of a series of differential phase changes.

Figure 4:
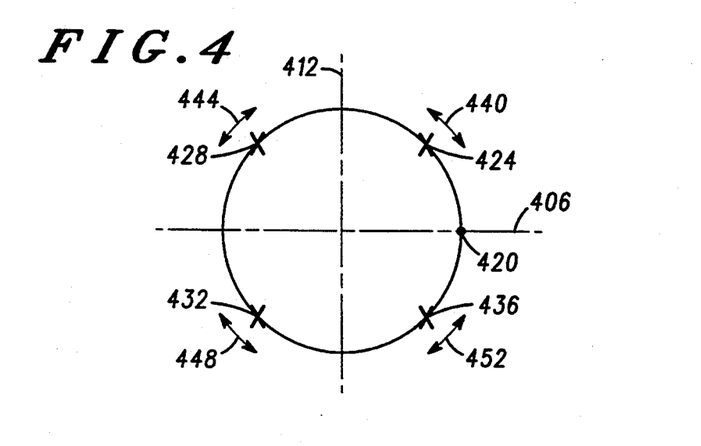
FIG. 4 is a graphical representation illustrating the phase relationship between two adjacent signal portions of a DQPSK-modulated signal.

FIG. 4 is a graphical representation illustrating the phase relationship between two adjacent signal portions of a DQPSK-modulated signal. An axis system is defined of abscissa axis 406 and ordinate axis 412. Abscissa axis is scaled in terms of $\cos(\omega t)$ and ordinate axis 412 is scaled in terms of $\sin(\omega t)$ of a generalized, sinusoidal signal (wherein $\omega$ is the cyclic frequency of the signal at time t).

A signal portion of a DQPSK-modulated signal positioned adjacent to the signal portion represented by point 420 is offset in phase relative to the phase of the signal portion represented by point 420. And, more particularly, the phase differences between any two adjacently-positioned signal portions of the DQPSK-modulated signal are permitted to be of phase differences of $+/-\pi/4$ or $+/-3\pi/4$ radians. Locations in the figure noted by X-markings 424, 428, 432, and 436 are offset in phase relative to point 420 by such phase differences.

Noise and other distortion introduced upon a sequence of a signal transmitted by a transmitter during transmission thereof can cause alteration in the phase differences between adjacently-positioned signal portions of the DQPSK-modulated signal. If excessive amounts of noise are introduced upon the signal, the differential phase changes between the adjacently-positioned signal portions vary too greatly, and the receiver which receives such a signal is unable to decode properly the signal received thereat.

Arrows 440, 444, 448, and 452 are representative of ranges of other-than-ideal phase differences (other than the ideal $+/-\pi/4$ or $+/- 3\pi/4$ phase differences) between adjacently-positioned signal portions of a DQPSK modulation scheme which still permit a receiver which receives such a signal to decode properly the signal. When excessive numbers of adjacently-positioned signal portions are of phase differences beyond the allowable ranges of phase differences (represented by arrows 440-452), a receiver is unable to decode properly a sequence of a signal including such phase differences.

A receiver including circuitry for determining times in which phase differences between adjacently-positioned signal portions of a DQPSK-modulated signal received by the receiver are of phase differences which exceed allowable phase differences may be utilized to provide a further indication of times in which excessive amounts of noise and other distortion have been introduced upon a sequence forming a portion of a signal transmitted to a receiver.

Figure 5:
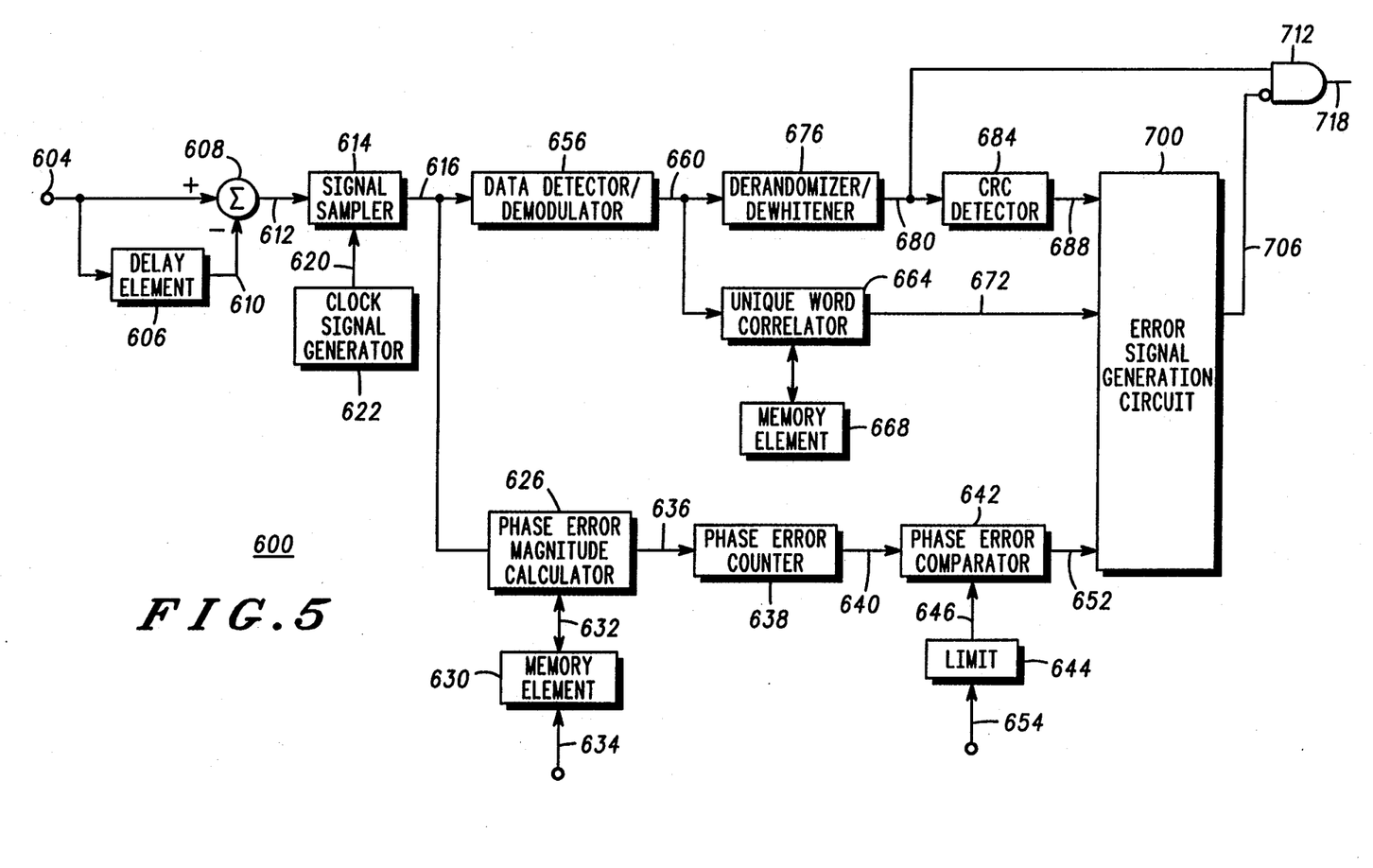
FIG. 5 is a block diagram of an error detector circuit of a preferred embodiment of the present invention.

Turning now to the block diagram of FIG. 5, an error detector circuit, referred to generally by reference numeral 600, of a preferred embodiment of the present invention is shown. Error detector circuit 600 is operative to provide an indication of times in which excessive amounts of noise or other distortion are introduced upon a sequence of a signal received by a radio receiver. Error detector circuit 600 receives sequences on line 604 representative of the phases of a signal received by a receiver incorporating circuit 600. Typically, down-conversion circuitry (not shown in FIG. 5) of a receiver is operative to generate such sequences.

Line 604 is coupled to an input of delay element 606 and also to a positive input of summing element 608. Delay element 606 is operative to delay the signal applied thereto and to generate a delayed signal on line 610. In the preferred embodiment in which error detector circuit 600 forms a portion of a receiver operative to receive a DQPSK-modulated signal generated in a TDMA communication scheme, delay element 606 is operative to delay the signal applied thereto for a time period corresponding to the time period defining adjacently-positioned signal portions of the signal. In such an embodiment, summing element 608 generates a difference signal on line 612 which is representative of the phase differences between adjacently-positioned signal portions of the sequence supplied on line 604.

Line 612 is coupled to signal sampler 614 which samples the difference signal applied thereto on line 612 and generates a sampled signal indicative thereof on line 616. Line 620 extending from clock signal generator 622 is further shown in the figure to represent a timing signal applied to signal sampler 614 to control the sampling period thereof.

The sampled signal generated on line 616 is applied to phase error magnitude calculator 626. Phase error magnitude calculator 626 is further coupled to permit access of data stored in memory element 630 by way of data lines 632.

Line 634 extending to memory element 630 is shown to represent alterability of the contents of memory element 630. That is to say, the data stored in memory element 630 is alterable by, for example, an operator of a receiver which incorporates error detector circuit 600. Means for altering the contents of memory element 630 may be accomplished by any conventional means, such as, for example, by a keypad input (not shown in the figure) coupled to memory element 630 by way of processing circuitry (also not shown in the figure).

Calculator 626 is operative to determine when phase differences between adjacently-positioned signal portions of the sequence generated on line 604 are of other than allowable phase differences (wherein such phase differences beyond the allowable values are determined to be "phase errors"), and to generate a signal on line 636 during times in which phase errors are detected by calculator 626.

With reference to FIG. 4, calculator 626 is operative to generate a signal on line 636 when phase differences between adjacently-positioned signal portions, represented by phase differences between point 420 and any of the X-markings 424-436, are beyond allowable phase differences, represented by arrows 440-452.

The signal generated on line 636 is applied to phase error counter 638. As the signal generated on line 636 is indicative of times in which phase error magnitude calculator 626 detects phase differences between adjacently-positioned signal portions to be of other than allowable phase differences, counter 638 is operative to count the number of times in which calculator 626 generates such a signal.

Counter 638 generates a signal on line 640 which is applied to phase error comparator 642. If the signal generated by counter 638 is of a value which exceeds a limit value, represented by limit block 644 and applied to comparator 642 on line 646, comparator 642 generates a signal on line 652.

Line 654 extending to limit block 644 is shown to indicate that the value of limit block 644 is alterable in the same manner, for instance, in which the contents of memory element may be altered by an input on line 634. Hence, the times in which comparator 642 generates a signal on line 652 is also variable.

The sampled signal generated on line 616 is further applied to data detector/demodulator 656. Data detector/demodulator 656 is operative to demodulate the signal applied thereto on line 616 and to generate a demodulated signal indicative thereof on line 660. Detector/demodulator 656 is operative to generate sequences of a signal on line 660 which are analogous to sequences 300 or 200 of FIGS. 3 or 2, respectively.

Line 660 is coupled to an input of unique word correlator 664. Unique word correlator 664 is also coupled to permit access thereof to data stored in memory element 668. Data stored in memory element 668 includes data representative of a unique word to be transmitted by a transmitter which transmits a signal comprised of the sequences generated in the discrete bursts during intermittent time periods. Correlator 664 generates a mathematical correlation between the data stored in memory element 668 and the unique word portion (analogous to unique word portion 320 of sequence portion 306 of sequence 300 of FIG. 3) and generates a signal on line 672 indicative of such correlation. If noise or other distortion introduced upon a sequence of a signal during transmission thereof distorts the unique word portion of the sequence received by the receiver, correlator 664 is operative, by the correlation process, to indicate the existence of such distortion on line 672.

Line 660 is also coupled to derandomizer/dewhitener 676 which performs derandomizing and dewhitening functions and generates a derandomized and dewhitened signal on line 680 which is coupled to cyclic redundancy code (CRC) detector 684.

Detector 684 is operative, responsive to reception of information bits of a sequence, to calculate an expected value of a cyclic redundancy code of such sequence and to compare the expected value, once calculated, with the cyclic redundancy code of the sequence actually received by the receiver. Detector 684 generates a signal on line 688 representative of comparisons between the expected value and the actual, received value of the cyclic redundancy code.

Lines 652, 672, and 688 are coupled to inputs of error signal generation circuit 700 to supply signals generated on the respective ones of the lines to circuit 700. Error signal generation circuit 700 of a preferred embodiment of the present invention shall be discussed in more detail hereinbelow. In general, circuit 700 is operative to generate an error indication on line 706 during times in which either unique word correlator 664 generates a signal on line 672 indicative of excessive amounts of noise or other distortion introduced upon a particular sequence received by a receiver incorporating circuit 600 or during times in which phase error magnitude comparator 642 generates a signal on line 652 indicative of distortion of a received sequence together with a similar indication by CRC detector 684 on line 688. Line 706 is coupled to a first input of AND gate 712 as is also line 680. An output of gate 712 is generated on line 718 only during times in which no signal is generated by circuit 700 on line 706.

Figure 6:
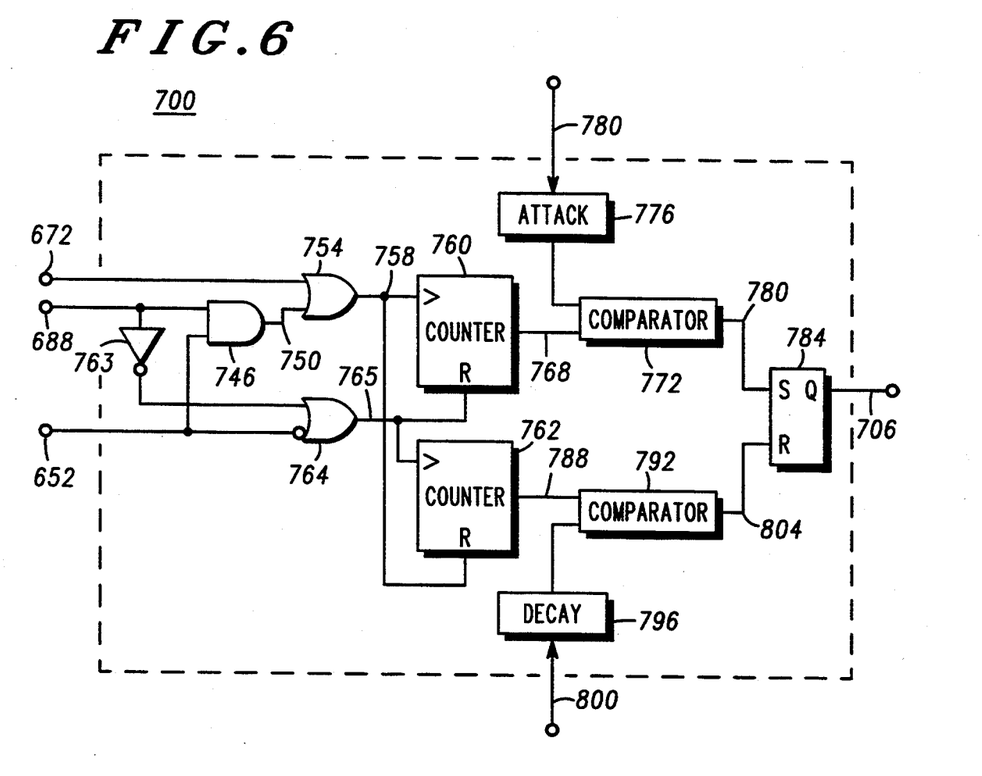
FIG. 6 is a block diagram of an error signal generation circuit which forms as a portion of the error detector circuit of FIG. 5.

Turning next to the block diagram of FIG. 6, error signal generation circuit 700 which forms a portion of error detector circuit 600 is shown in greater detail. Lines 652, 672, and 688 are again shown to form inputs to circuit 700, and line 706 is again shown to form an output of circuit 700.

Line 652 upon which a signal generated by phase error comparator 642 is generated, is applied to a first input of logical-AND gate 746. Line 688, upon which a signal formed by detector 684 is generated, is supplied to a second input of gate 746. The signal generated on line 688 is indicative of times in which detector 684 detects the presence of excessive amounts of noise or other distortion introduced upon a sequence received by a receiver incorporating detector circuit 600 of FIG. 5. When signals are generated on both lines 688 and 652, gate 746 generates a signal on line 750. Line 750 is coupled to a first input of logical-OR gate 754. Line 672 upon which a signal formed by correlator 664 is generated, is coupled to a second input of gate 754. Gate 754 is operative to generate a signal on line 758 during times in which a signal is generated either on line 672 or on line 750.

Line 758 is coupled to a counting input of first counter 760 and to a reset input of second counter 762. And, the signal generated on line 688 is inverted by inverter 763 and applied to a first input of logical-OR gate 764. The signal generated on line 652 is applied to an inverted input of gate 764. Gate 764 generates an output signal on line 765 which is coupled to a reset input of first counter 760 and to a counting input of second counter 762. Counter 760 is operative to count the number of times in which gate 754 generates a signal on line 758 and to generate a signal indicative of such count on line 768 which is applied to comparator 772. (Counter 760 is reset when a signal is generated on line 765.)

Comparator 772 is operative to compare the value of the signal generated on line 768 with a selected value, represented by attack block 776. Line 780 extending to attack block 776 is shown to indicate that the value of attack block 776 is variable (also, for example, in a manner similar to the manner in which the data stored in memory element 630 and the value of limit block 644 is variable). Comparator 772 generates a signal on line 781 which is applied to latching element 784, here a flip-flop. Latching element 784 generates an output signal which forms the signal generated on line 706.

Second counter 762 is operative to count the number of sequences in which the signal generated on line 766 is indicative of a sequence which does not include excessive amounts of noise or other distortion introduced thereupon. Counter 762 generates a signal on line 788 representative of the number of sequences, sequentially transmitted, which do not include excessive amounts of noise or other distortion introduced thereupon. (Second counter 762 is reset by the signal generated on line 758 which is representative of times in which excessive amounts of noise or other distortion are introduced upon a sequence received by a receiver.)

Line 788 is coupled to an input of comparator 792 which compares the value of the signal generated on line 788 with a threshold, here indicated by decay block 796. Line 800 extending to decay block 796 (analogous to line 780 extending to attack block 776 and operable in a similar manner) is shown to indicate that the value of the threshold represented by decay block 796 is variable. Comparator 792 generates a comparison signal on line 804 which is applied to a reset input of latching element 784.

Hence, when excessive numbers of sequences of a signal received by a receiver include excessive amounts of noise or other distortion introduced thereupon, as indicated by combinations of three different determinations, error signal generation circuit 700 generates a signal on line 706 and continues to generate the signal on line 706 until the desired number of sequences of a signal received by a receiver are determined to be free of excessive amounts of noise or other interference. Because limit block 644 (of FIG. 5), attack block 776, and decay block 796 are variable, the number of sequences including, or free of, excessive amounts of noise or other distortion introduced thereupon to cause a signal to be generated, or to no longer be generated, on line 706 is variable.

Figure 7:
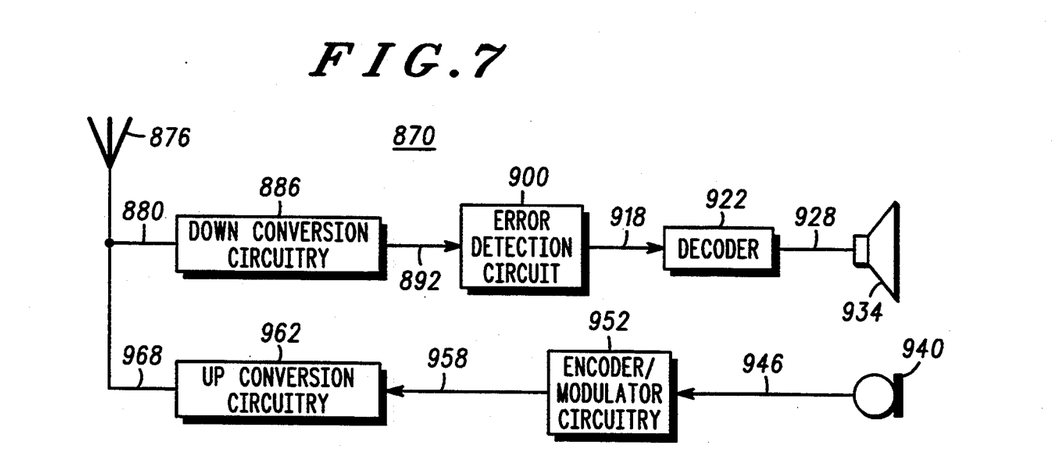
FIG. 7 is a block diagram of a radio transceiver of a preferred embodiment of the present invention which includes the error detector circuit of FIG. 5 as a portion thereof.

Turning next to the block diagram of FIG. 7, a radio transceiver, referred to generally by reference numeral 870, is shown. Radio transceiver 870 includes an error detector circuit, such as circuit 600 of FIG. 5 as a portion thereof.

A signal transmitted by a transmitter is received by antenna 876 of transceiver 870. A signal representative of the signal received by antenna 876 is generated on line 880 and is applied to down-conversion circuitry 886. Down-conversion circuitry 886 is operative to down-convert in frequency the signal applied thereto and to generate an intermediate frequency signal on line 892. The signal generated on line 892 is applied to error detector circuit 900 which is operative in a manner analogous to operation of circuit 600 of FIG. 5. When error detector circuit determines that a sequence of a signal received by antenna 876 of the transceiver is free of excessive amounts of noise or other distortion introduced thereupon, a signal representative of the sequence is generated on line 918 and applied to decoder 922. Decoder 922 is operative to decode the signal applied thereto and to generate a decoded signal on line 928 which is applied to a transducer, here shown to be speaker 934.

Radio transceiver 870 is further shown to include a transmit portion which includes microphone 940 which generates a signal on line 946 which is coupled to encoder/modulator circuitry 952. Circuitry 952 generates an encoded and modulated signal on line 958 which is applied to up-conversion circuitry 962. Up-conversion circuitry 962 is operative to up-convert in frequency the signal applied thereto and to generate the up-converted signal on line 968 which is applied to antenna 876 for transmission therefrom.

Figure 8:
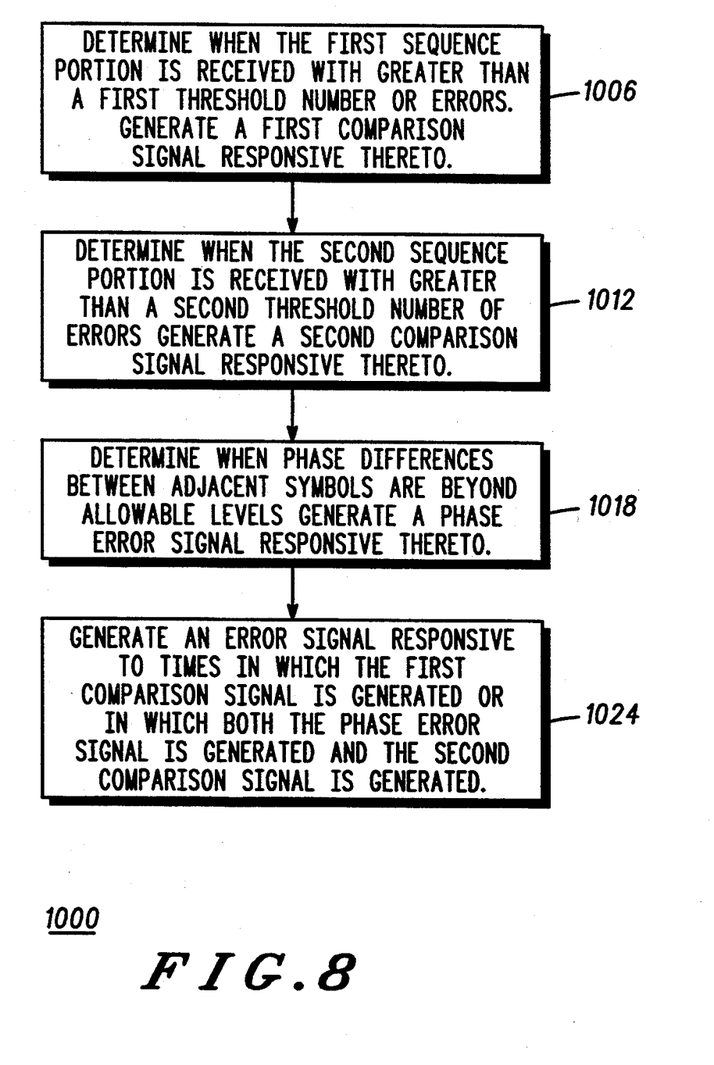
FIG. 8 is a flow diagram listing the method steps of the method of a preferred embodiment of the present invention.

Turning finally now to FIG. 8, a flow diagram listing the method steps of a method, referred to generally by reference numeral 1000, of a preferred embodiment of the present invention are listed. Method 1000 is operative in a receiver operative to receive a discretely-encoded signal comprised of at least one sequence of a series of phase values and includes a first and second sequence portion. Method 1000 detects when a sequence of the at least one sequence is comprised of excessive numbers of erroneous signal portions.

First, and as indicated by block 1006 a determination is made when the first sequence portion is received by the receiver with greater than a first threshold number of errors and a first comparison signal is generated responsive thereto.

Next, and as indicated by block 1012, a determination is made when the second sequence portion is received by the receiver with greater than a second threshold number of errors. A second comparison signal is generated responsive thereto.

Next, and as indicated by block 1018, a determination is made when phase differences between adjacent symbols of the discretely-encoded signal are beyond allowable levels. A phase error signal is generated responsive thereto.

Finally, and as indicated by block 1024, an error signal is generated responsive to times in which the first comparison signal is generated or in which both the phase error signal is generated and the second comparison signal is generated.

While the present invention has been described in connection with the preferred embodiments shown in the various figures, it is to be understood that other similar embodiments may be used and modifications and additions may be made to the described embodiments for performing the same function of the present invention without deviating therefrom. Therefore, the present invention should not be limited to any single embodiment, but rather construed in breadth and scope in accordance with the recitation of the appended claims.

What is claimed is:

1. An error detector circuit for a receiver operative to receive a discretely-encoded signal comprised of at least one sequence formed of a plurality of signal portions having phase values associated therewith, wherein the at least one sequence includes a first sequence portion and a second sequence portion, said error detector circuit operative to detect when a selected number of sequences of the at least one sequence comprising the discretely-encoded signal is comprised of excessive numbers of erroneous signal portions, said error detector circuit comprising:

a first sequence portion comparator for determining when the first sequence portion of the at least one sequence comprising the discretely-encoded signal is received by the receiver with greater than a first threshold number of errors and for generating a first comparison signal of a first signal level responsive thereto;

a second sequence portion comparator for determining when the second sequence portion of the at least one sequence comprising the discretely-encoded signal is received by the receiver with greater than a second threshold number of errors and for generating a second comparison signal of a first signal level responsive thereto;

a phase error detector for determining when phase differences between adjacent signal portions of the discretely-encoded signal are beyond allowable levels greater than a third threshold number of times and for generating a phase error signal of a first signal level responsive thereto; and an error signal generator for generating an error signal when either the first sequence portion comparator generates the first comparison signal of the first signal level or in which both the phase error detector generates the phase error signal of the first signal level and the second sequence portion comparator generates the second comparison signal of the first signal level, collectively in excess of a fourth threshold number of times.

2. The error detector circuit of claim 1 further comprising a memory element for storing data representative of signal values of a selected first sequence portion to be transmitted to the receiver.

3. The error detector circuit of claim 2 wherein said first sequence portion comparator comprises a first sequence portion correlater coupled to receive a signal representative of the signal received by the receiver and the data stored in the memory element, said first sequence portion correlator for correlating the data stored in the memory element with the signal representative of the signal received by the receiver, and thereby to determine when the first sequence portion of the at least one sequence comprising the discretely-encoded signal is received by the receiver with greater than the first threshold number of errors.

4. The error detector circuit of claim 3 further comprising a counter for counting numbers of times in which the first sequence portion correlator determines that the first sequence portion of the at least one sequence comprising the discretely-encoded signal is received by the receiver with greater than the first threshold number of errors.

5. The error detector circuit of claim 1 wherein said second sequence portion comparator comprises a calculator for calculating expected values of a second sequence portion to be received by the receiver responsive to portions of the at least one sequence comprising the discretely-encoded signal other than the second sequence portion thereof, and for comparing the calculated expected values of the second sequence portion with corresponding values of a signal representative of the second sequence portion of the at least one sequence comprising the discretely-encoded signal received by the receiver.

6. The error detector circuit of claim 1 wherein said phase error detector comprises a delay element and a summing element wherein the delay element is coupled to receive a signal representative of the at least one sequence comprising the discretely-encoded signal and the summing element is operative to receive the signal representative of the at least one sequence comprising the discretely-encoded signal and a delayed signal generated by the delay element and to generate a difference signal indicative of differences between the signals applied thereto.

7. The error detector circuit of claim 6 further comprising a memory element for storing data representative of allowable phase differences between adjacent symbols of the discretely-encoded signal.

8. The error detector circuit of claim 7 wherein said phase error detector further comprises a phase error calculator coupled to receive the difference signal generated by the summing element and the data stored in the memory element, said phase error detector for determining when the phase differences between the adjacent symbols of the discretely-encoded signal are beyond allowable levels.

9. The error detector circuit of claim 8 further comprising a phase error counter operative to count numbers of times in which the phase differences between the adjacent symbols of the discretely-encoded signal are beyond the allowable levels and for generating the phase error signal of the first signal level when the phase differences are beyond the allowable levels greater than the third threshold number of times.

10. The error detector circuit of claim 1 wherein said error signal generator comprises an error-indication counter for counting numbers of times in which either the first sequence portion comparator generates the first comparison signal or in which both the phase error detector generates the phase error signal of the first signal level and the second sequence portion comparator generates the second comparison signal of the first signal level, and for generating a preliminary error signal responsive to said number of times.

11. The error detector circuit of claim 10 wherein the error-indication counter of the error signal generator is reset responsive to times in which said second sequence portion comparator fails to generate the second comparison signal of the first signal level.

12. The error detector circuit of claim 11 wherein said error signal generator further comprises an error signal comparator coupled to receive said preliminary error signal and for causing generation of the phase error signal when the preliminary error signal is of a level indicative of a value in excess of the fourth threshold.

13. The error detector circuit of claim 12 wherein said error signal generator further comprises a latching element coupled to receive a signal generated by the error signal comparator, said latching element for generating the phase error signal responsive to the signal generated by the error signal comparator.

14. The error detector circuit of claim 13 wherein said error signal generator further comprises a good-signal indication counter for counting numbers of times in which the second sequence comparator fails to generate the second comparison signal of the first signal level, and for generating a preliminary error-free signal responsive to said number of times.

15. The error detector circuit of claim 14 wherein the good-signal indication counter is reset responsive to times in which the second sequence portion comparator generates the second comparison signal of the first signal level.

16. The error detector circuit of claim 15 wherein said error signal generator further comprises an error-free indication comparator coupled to receive said preliminary error-free signal, said error-free indication comparator for determining when the preliminary error-free signal is of a level indicative of a value in excess of a fifth threshold.

17. The error detector circuit of claim 16 wherein a signal generated by the error-free indication counter is applied to the latching element to unlatch the latching element when the signal generated by the error-free indication counter is received by the latching element.

18. The error detector circuit of claim 16 further comprising means for varying a value of the fifth threshold.

19. The error detector circuit of claim 1 further comprising means for varying a value of the first threshold.

20. The error detector circuit of claim 1 further comprising means for varying a value of the third threshold.

21. The error detector circuit of claim 1 further comprising means for varying a value of the fourth threshold.

22. In a radio receiver having receiver circuitry operative to receive a discretely-encoded signal comprised of at least one sequence formed of a plurality of signal portions having phase values associated therewith wherein the at least one sequence includes a first sequence portion and a second sequence portion, a combination with the receiver circuitry of an error detector circuit operative to detect when a sequence of the at least one sequence comprising the discretely-encoded signal is comprised of excessive numbers of erroneous signal portions, said error detector circuit comprising:

a first sequence portion comparator for determining when the first sequence portion of the at least one sequence comprising the discretely-encoded signal is received by the receiver with greater than a first threshold number of errors and for generating a first comparison signal of a first signal level responsive thereto;

a second sequence portion comparator for determining when the second sequence portion of the at least one sequence comprising the discretely-encoded signal is received by the receiver with greater than a second threshold number of errors and for generating a second comparison signal of a first signal level responsive thereto;

a phase error detector for determining when phase differences between adjacent signal portions of the discretely-encoded signal are beyond allowable levels greater than a third threshold number of times and for generating a phase error signal of a first signal level responsive thereto; and     an error signal generator for generating an error signal responsive to times in excess of a fourth threshold number of times in which the first sequence portion comparator generates the first comparison signal of the first signal level or in which both the phase error detector generates the phase error signal of the first signal level and the second sequence portion comparator generates the second comparison signal of the first signal level.

23. A method for a receiver operative to receive a discretely-encoded signal comprised of at least one sequence formed of a plurality of signal portions having phase values associated therewith wherein the at least one sequence includes a first sequence portion and a second sequence portion, said method for detecting when a sequence of the at least one sequence comprising the discretely-encoded signal is comprised of excessive numbers of erroneous signal portions, said method comprising the steps of:

determining when the first sequence portion of the at least one sequence comprising the discretely-encoded signal is received by the receiver with greater than a first threshold member of errors and for generating a first comparison signal of a first signal level responsive thereto;

determining when the second sequence portion of the at least one sequence comprising the discretely-encoded signal is received by the receiver with greater than a second threshold number of errors and for generating a second comparison signal of a first signal level responsive thereto;

determining when phase differences between adjacent signal portions of the discretely-encoded signal are beyond allowable levels greater than a third threshold number of times and for generating a phase error signal of a first signal level responsive thereto; and     generating an error signal responsive to times in excess of a fourth threshold number of times in which the first sequence portion comparator generates the first comparison signal of the first signal level or in which both the phase error detector generates the phase error signal of the first signal level and the second sequence portion comparator generates the second comparison signal of the first signal level.

* * * * *